(12) United States Patent
Yamamoto et al.

(10) Patent No.: US 7,600,264 B2
(45) Date of Patent: Oct. 6, 2009

(54) DESKTOP SECURITY (75) Inventors: Hirofumi Yamamoto, Bellevue, WA (US); Mohamed E. Fathalla, Sammamish, WA (US); Yashabh Sethi, Bellevue, WA (US); Richard B. Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 11/193,312

(22) Filed: Jul. 30, 2005

(65) Prior Publication Data
US 2007/0028294 A1  Feb. 1, 2007

(51) Int. Cl.
G06F 17/30 (2006.01)
G06F 3/00 (2006.01)
G06F 9/50 (2006.01)
G06F 13/00 (2006.01)
G06F 7/04 (2006.01)

(52) U.S. Cl. .............................. 726/27; 726/2; 719/313
(58) Field of Classification Search .................... 726/2, 726/27; 719/313
See application file for complete search history.

(56) References Cited

U.S. PATENT DOCUMENTS

| 7,398,532 | B1 * | 7/2008 | Barber et al. ............... 719/328 |
| 2002/0099952 | A1 * | 7/2002 | Lambert et al. ............. 713/200 |
| 2006/0259487 | A1 * | 11/2006 | Havens et al. ................. 707/9 |

OTHER PUBLICATIONS

Xenitellis, Simeon. "Security Vulnerabilities in Event-Driven Systems", IFIP / SEC2002 Conference on Security in the Information Society : Visions and Perspectives, May 7-9, 2002, Cairo, Egypt, In Proceedings, Security in the Information Society: Visions and Perspectives, Kluwer Academic Press, pp. 147-160.*

* cited by examiner

*Primary Examiner*—Michael J Simitoski
(74) *Attorney, Agent, or Firm*—Workman Nydegger (57) ABSTRACT In aspects, interactions between processes of a desktop are allowed or denied based on security data. The security data may comprise a first bitmap that indicates whether a requesting process is allowed to cause an action to occur, a second bitmap that indicates whether a process is protected from having an action occur, and a third bitmap that indicates whether the requesting process may override protection, if any, in causing the action to occur.

19 Claims, 5 Drawing Sheets

DESKTOP SECURITY

BACKGROUND

In the past, relatively few computers were connected to the Internet. For computers that were not connected to the Internet, computer security involved controlling who was allowed to access the computers and restricting the programs installed on the computers. As more computers have become connected to the Internet, however, computer security has become more of an issue as attempts to access a computer may come from any of millions of computers connected to the Internet.

SUMMARY

Briefly, aspects of the subject matter described herein relate to computer security. In aspects, interactions between processes of a desktop are allowed or denied based on security data. The security data may comprise a first bitmap that indicates whether a requesting process is allowed to cause an action to occur, a second bitmap that indicates whether a process is protected from having an action occur, and a third bitmap that indicates whether the requesting process may override protection, if any, in causing the action to occur.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

Other aspects will become apparent from the following Detailed Description when taken in conjunction with the drawings, in which:

DETAILED DESCRIPTION

Exemplary Operating Environment

Figure 1:
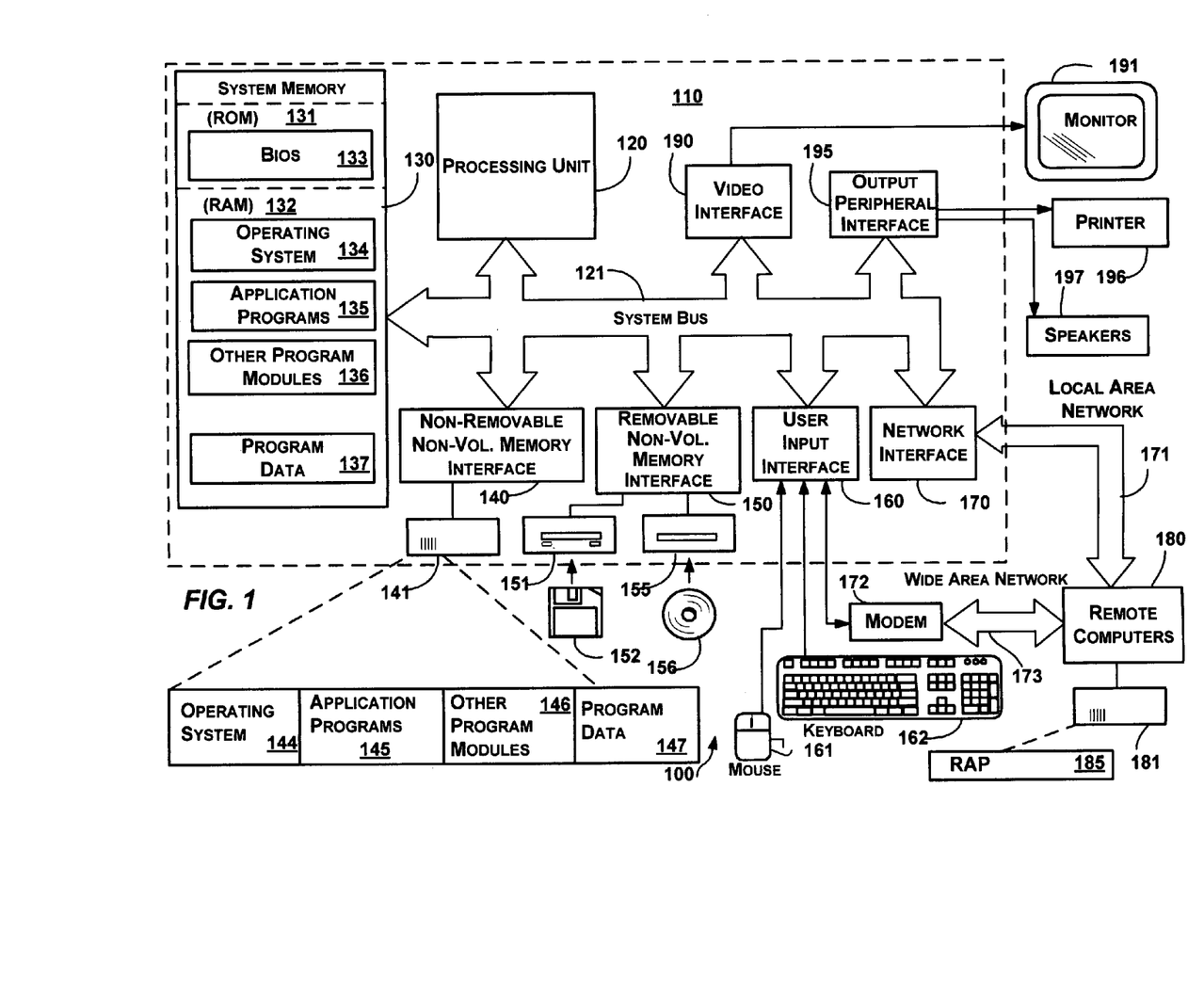
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

UI Security

Figure 2:
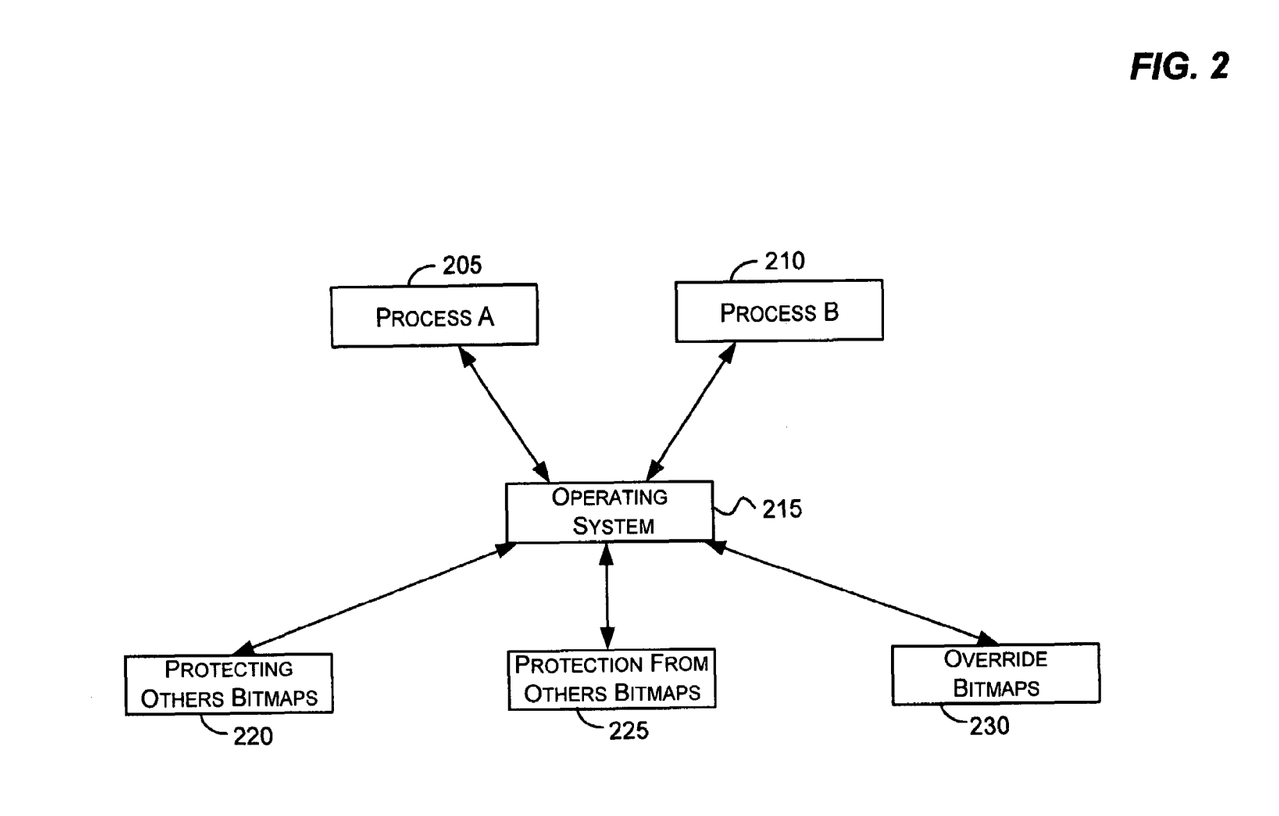
FIG. 2 is a block diagram that represents an exemplary environment in accordance with aspects of the subject matter described herein.

FIG. 2 is a block diagram that represents an exemplary environment in accordance with aspects of the subject matter described herein. The environment includes a process A 205, a process B 210, and an operating system 215. Bitmaps related to security and associated with each process may be stored by the operating system 215 and are represented as protecting others bitmaps 220, protection from others bitmaps 225, and override bitmaps 230, which are described in more detail below.

The process A 205 and the process B 210 may both read from and/or write to a desktop. Reading from and/or writing to the desktop are sometimes referred to as accessing the desktop. Conceptually, the desktop may include any interface arranged to interact with a user. For example, a desktop interface may provide graphical and/or textual information to a user. As another example, a desktop interface may provide input from a keyboard, mouse, or other input device.

The desktop may also include any interface arranged to interact with objects that are displayed. For example, the desktop may include an interface that allows a program to access an image displayed on a display.

The processes A 205 and B 210 may interact with each other via a plurality of mechanisms, depending on those supported by the operating system 215. For example, the process A 205 may send data to the process B 205 through an input injection application programming interface (API). An input injection API may allow one process to provide input to another process. The operating system 215 may be configured so that the process into which input is injected is unable to distinguish between data received from the input injection API and data received in response to user actions (e.g., through a keyboard or mouse).

As another example, the process A 205 may hook an input stream (e.g., generated by a keyboard, mouse, or the like) of the process B 210. Each time input is received from the hooked stream, the process A 205 may be called and given the input. The process A 205 may then perform various actions based on the input. The input may also be passed to the process B 210. Again, the operating system 215 may be configured so that the process B 210 may not be aware that the process A 205 has hooked one or more of the process B 210's input streams.

As another example, the process A 205 may send a message to the process B 205 by, for example, calling an operating system 215 API to post an event to the process B 205. Periodically, the process B 210 may read events that have been posted to it and may perform actions based thereon. For example, the process A 205 may post a close event to the process B 210. In response, the process B 210 or a window thereof may close.

As another example, information from the process B 210 may be copied into a clipboard. This information may then be obtained by the process A 205.

The operating system 215 may be configured such that processes are unaware of which process sent messages to, hooked input streams, accessed clipboards, or otherwise interacted with them. For example, in the case of a message relayed as an event, a process may not be able to determine whether the message came in response to a user selecting a close button or in response to another process which posted a close event to the process.

As will be readily appreciated, this mechanism for interacting between desktop processes has security issues. For example, if a browser is taken over by a malicious process, the malicious process may cause a drive to be formatted by opening a standard format utility and injecting the appropriate input into the format utility. A malicious process that hooks the input of another process may be able to capture user names and passwords and then forward this information to a remote computer. As another example, a malicious process may close a security warning window of another process before a user has time to see or read the warning.

To address these security problems, one or more access control list (ACL) may be created for each process. Each ACL may be implemented by a bitmap, for example, wherein each bit represents whether the process may engage in a specified activity. For example, a bit in the bitmap may indicate that a process cannot inject input into other processes. This may prevent the process from formatting a hard drive through injecting input into a format utility, for example.

As another example, another bit in the bitmap may indicate that a process cannot hook a keyboard input stream. This may prevent the process from obtaining user names and passwords, for example.

In general, the bitmap may be configured such that any security-related activity that a process may attempt may be allowed or denied based on the bits in the bitmap. Exemplary activities may include:

Sending messages. This includes synchronous and asynchronous messaging.

Hooking input. This may include global, thread, and journal hooks. There may be one bit to allow/deny each type of hook and/or one bit to allow/deny all hooks.

Injecting input. This includes the capability to inject input or attach input to queues as well as blocking input. There may be one bit per stream or queue and/or one bit to allow/deny injecting, attaching, or blocking input on all streams or queues.

Clipboard access. This may be one bit to allow/deny read access to the clipboard and one bit to allow/deny write access to the clipboard.

Handle validation. This includes validation of handles to windows, icons, menus, and the like. These handles may be owned by processes and access checks may be performed in accordance with security bitmaps to grant or deny access to other processes. For example a malicious process might try to change properties of a window owned by an admin process. The admin process may choose to deny access to the malicious process based on an ACL implemented by a bitmap. In general, the ACL may apply to the handle itself such that the handle is invalid for processes which do not have rights (as granted by the ACL) to access it. Some examples of the APIs which may fail as a result may include SetWindowLongPtr (and family), EnableWindow, and SetLayeredWindowAttributes.

Atom table. An atom table may comprise a global resource shared by all processes executing on a computer. Like clipboard there may be one bit for each of add, delete, and view access to allow/deny such access to the atom table or a particular atom in the atom table.

The bitmap described above may be used to deny or allow a process to engage in certain activities. In one sense, this may be thought of as a "protecting others bitmap" that protects other processes from activities of the process. Each of the protecting others bitmaps 220 may be stored by the operating system 215 and associated with a process.

Another bitmap may be associated with a process to protect it from other processes. This bitmap may indicate what activities other processes may perform as it relates to the process. For example, the bitmap may indicate that no other process may inject into or hook an input stream of the process. In general, the bitmap may include one bit for each activity for which protection is desired. This additional bitmap (sometimes referred to as a "protection from others bitmap") may be useful, for example, to prevent access to sensitive processes by other processes that have somehow gained more rights than they should have. For example, without a protection bitmap, if a process with many rights is hijacked by a malicious process, the malicious process may gain access to sensitive processes.

Some processes may need to have the ability to override protection bits of the protection from others bitmap. These processes may include, for example, user accessibility programs where it is critical to have access to a process in order for a disabled person to communicate with the process. For example, a disabled person may require a sip-and-puff input device to interact with a computer. The sip-and-puff input device may interact with a process that translates the disabled person's instructions into commands applicable to programs.

Figure 3:
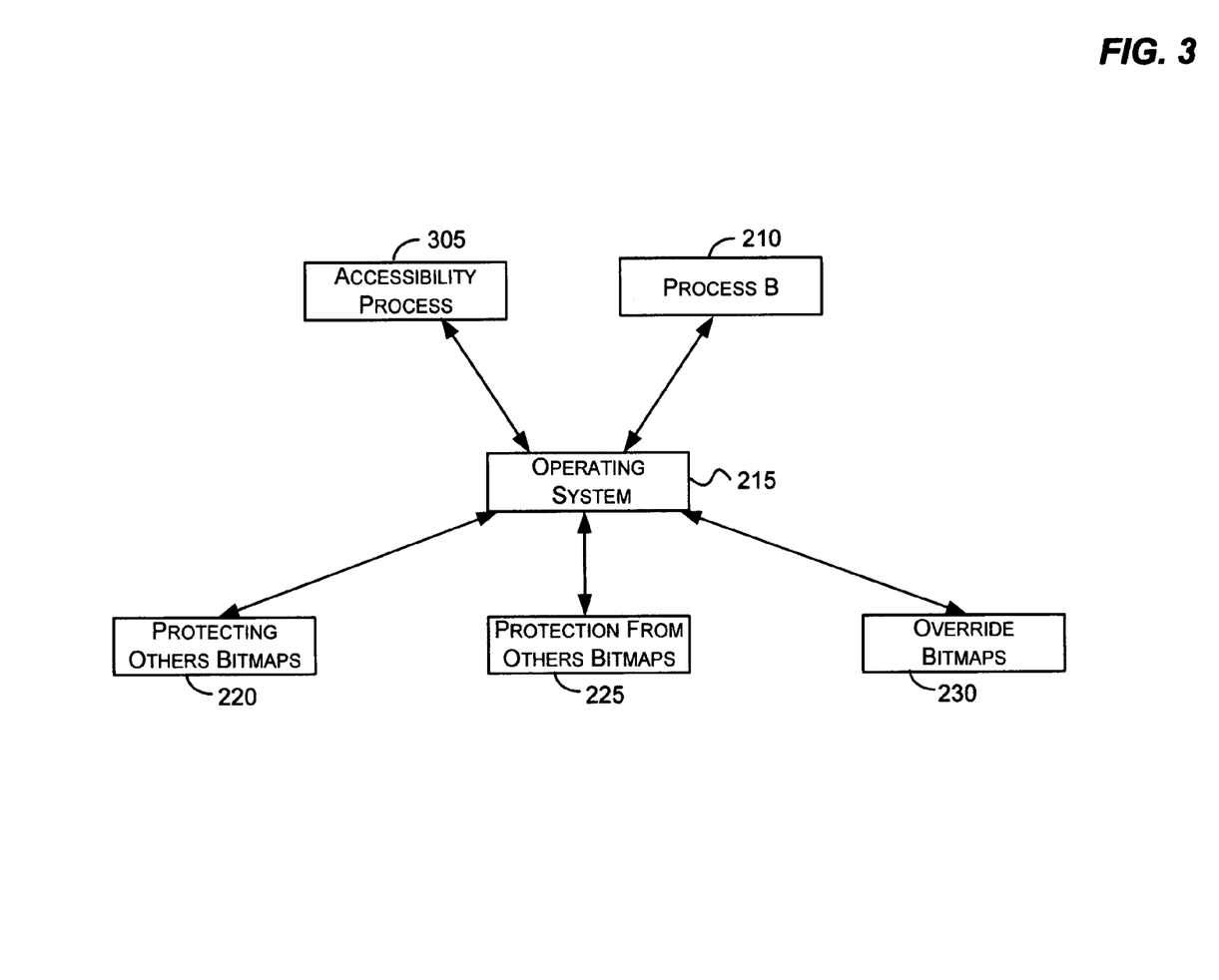
FIG. 3 is a block diagram that generally represents another exemplary environment in accordance with aspects of the subject matter described herein.

For example, referring to FIG. 3, which is a block diagram that generally represents another exemplary environment in accordance with aspects of the subject matter described herein, an accessibility process 305 may need to provide input to the process B 210. The accessibility process 305 may communicate these commands to other processes including the process B 210 via an injection input mechanism. If the accessibility process 305 wishes to communicate to a process that is associated with a protection bitmap that denies injection input, this protection may need to be overridden. To accomplish this, an override bitmap may be associated with each process. The override bitmap may indicate which protected activities the process may override.

The operating system may store and maintain the bitmaps 220, 225, and 230 in protected memory so that they cannot be accessed by user-mode processes. When a process attempts to interact with another process, the operating system 215 may determine whether the interaction is permitted based on bitmaps associated with the processes as described in more detail in conjunction with FIG. 5.

Figure 4:
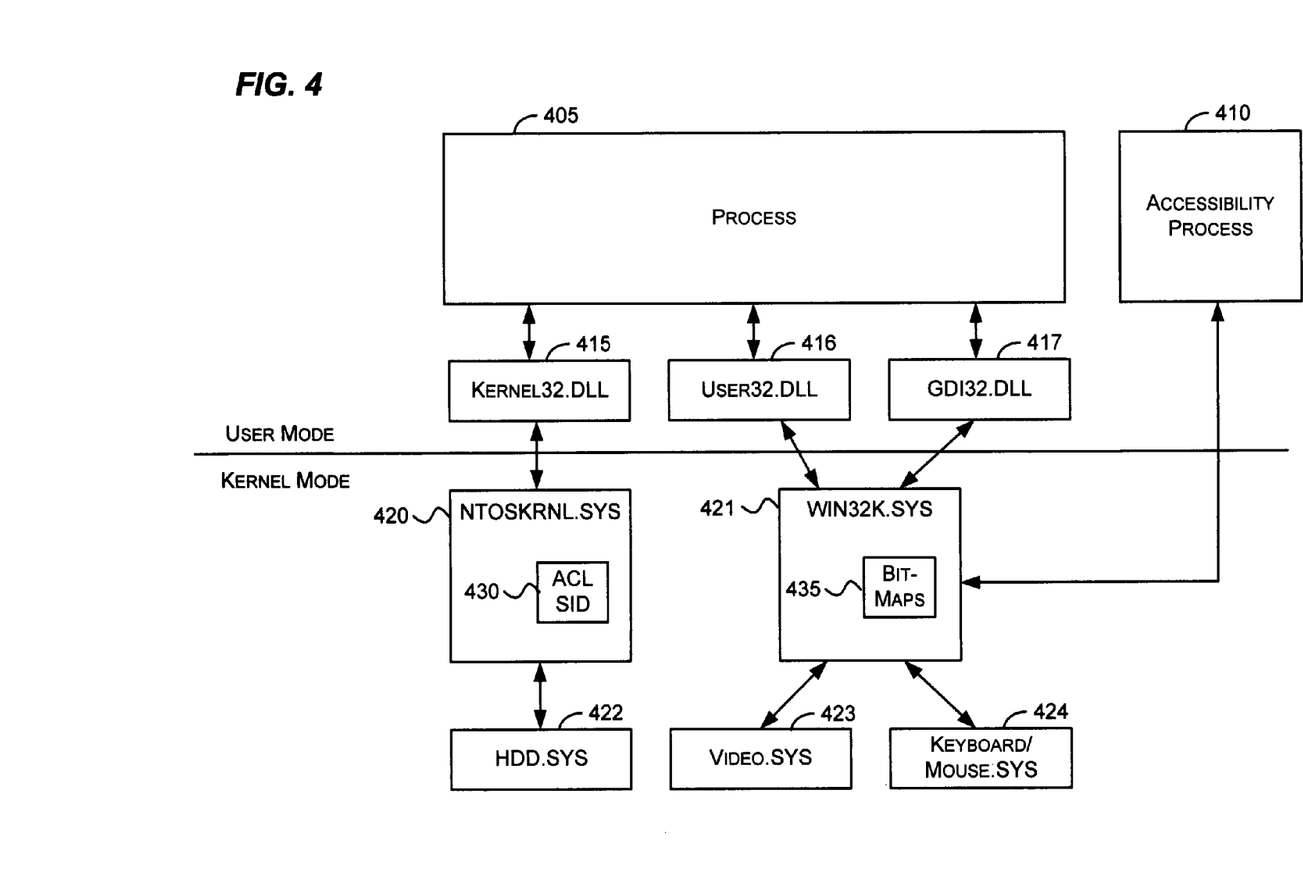
FIG. 4 is a block diagram that represents an exemplary environment in accordance with aspects of the subject matter described herein.

FIG. 4 is a block diagram that represents an exemplary environment in accordance with aspects of the subject matter described herein. The environment includes a process 405, and accessibility process 410, dynamic link libraries (DLLs) 415-417, and system components 420-424. In one embodiment, the process 405, the accessibility process 410, and DLLs 415-417 execute in user mode while the system components 420-424 execute in kernel mode. In other embodiments, however, each of the process 405, the accessibility process 410, the DLLs 415-417, and the system components 420-424 may execute in user mode or kernel mode without departing from the spirit or scope of the subject matter described herein.

In operation, whenever the process 405 wishes to access a file, the process 405 may ask a system component to perform various actions. The process 405 may ask the system component to perform an action via an API provided by one of the DLLs 415-417. The DLL may then call a system component (e.g., NTOSKRNL.SYS 420) and ask the system component to perform an action. Requests received by a system component (e.g., NTOSKRNL.SYS) may be queued and dispatched to other system components (e.g., HDD.SYS) as needed.

Certain DLLs (e.g., USER32.DLL 416 and GDI32.DLL 417) may be involved in interacting with a desktop. These DLLs may, for example, be used to create a window, display the window, draw or paint inside a window, and perform various other user-interface types of actions. These DLLs may manage the windows of the desktop, input to the windows, interaction with a clipboard, messages between objects displayed on the desktop, and the like. To perform these actions, the DLLs may call system components (e.g., WIN32K.SYS) that have control over system resources (e.g., the video card and input devices).

System data relating to the desktop may be stored by a system component (e.g., WIN32K.SYS). This data may include, for example, a windows tree that indicates which windows are displayed on the desktop, clipboard data, keyboard, mouse, or other input, and the like.

The accessibility process 410 may be installed as a system component such as a hardware driver or as a user-mode process which injects input via a system component. In the latter configuration, the system component may attempt to make the injection appear to other processes to come from a hardware device.

A system component (e.g., NTOSKRNL.SYS) may manage ACL security identifiers (SIDs) (e.g., ACL SID 430). Bitmaps related to desktop security may be stored in another system component (e.g., WIN32K.SYS). There may be one ACL SID 430 associated with each process. The ACL SID 430 may be used to lookup entries in the bitmaps 435 to determine whether a process has rights to engage in a requested activity.

Figure 5:
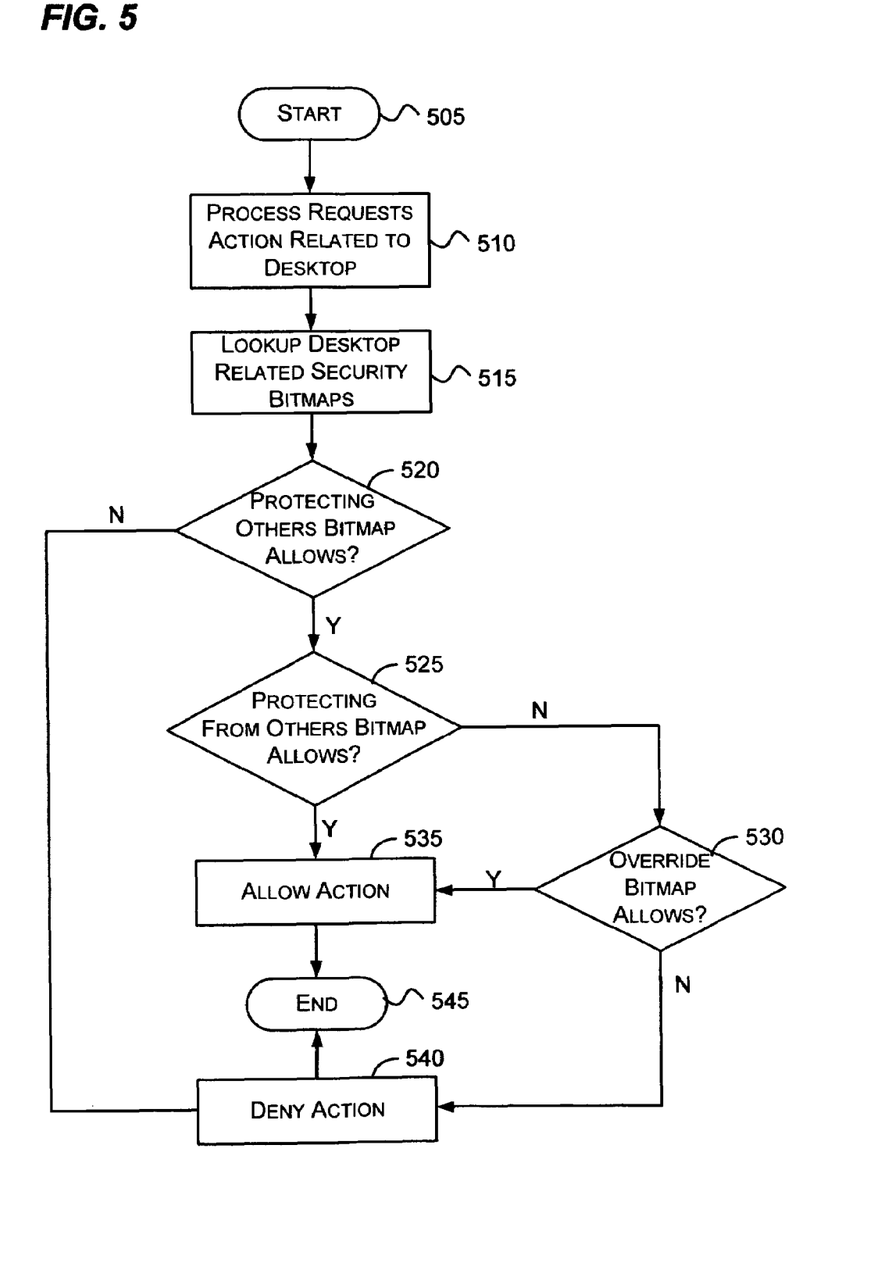
FIG. 5 is a flow diagram that generally represents actions that may occur in allowing or denying a request related to a desktop in accordance with aspects of the subject matter described herein.

FIG. 5 is a flow diagram that generally represents actions that may occur in allowing or denying a request related to a desktop in accordance with aspects of the subject matter described herein. At block 505, the actions start.

At block 510, a process requests an action related to the desktop. For example, the process may request to inject input, hook an input stream, access a clipboard, request that a message be sent to another process, and the like.

At block 515, bitmaps related to desktop security are accessed to determine whether the process should be allowed to cause the action to occur.

At block 520, a determination if made as to whether the protecting others bitmap allows the action for the process. If so, the actions continue at block 525; otherwise, the actions continue at block 540. For example, if the process has requested to hook the input stream of another process, the process will be denied if the protecting others bitmap associated with the process does not allow hooking input streams.

At block 525, a determination is made as to whether the protecting from others bitmap allows the action. If so, the actions continue at block 530; otherwise, the actions continue at block 535. For example, even if the process has rights to hook an input stream of another process, if the other process has indicated that its input stream may not be hooked, the process may not be able to hook the input stream unless it has override capabilities.

At block 530, a determination is made as to whether the override bitmap indicates that the process may override a protecting from others bitmap to cause the action to occur. If so, the actions continue at block 535; otherwise, the actions continue at block 540.

At block 535, the action is allowed whereas at block 540, the action is denied based on the bitmaps. At block 545, the actions stop. The actions above may be repeated each time a process desires to perform an action related to the desktop.

51:25-52:30 start of other way

59:00

As can be seen from the foregoing detailed description, aspects have been described for user interface security. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having stored computer-executable instructions which, when executed by a processor of a computing system, perform a method comprising:
   from a requester, receiving a request to perform an action related to a desktop;
   determining whether the requestor has rights to perform the action based at least in part on security data related to the request, wherein the security data comprises protecting others data, protecting from others data, and overriding data; and
   if the requestor has rights to perform the action, allowing the action.

2. The computer-readable medium of claim 1, wherein the requester comprises a user-mode process and wherein the security data is protected from access by the requestor by placing it in memory accessible via kernel-mode processes.

3. The computer-readable medium of claim 1, wherein at least some of the security data is stored in a first bitmap, and wherein the request comprises a request to interact with a process associated with the desktop, and wherein the method further comprises determining via a second bitmap whether the process is protected from having the action performed.

4. The computer-readable medium of claim 3, wherein if the process is protected from having the action performed, determining via a third bitmap whether the requester may override the protection.

5. The computer-readable medium of claim 4, wherein the requestor has rights to perform the action if the first bitmap indicates that the requestor is allowed to cause the action to occur and the second bitmap does not protect against the action.

6. The computer-readable medium of claim 4, wherein the requestor has rights to perform the action if the first bitmap indicates that the requestor is allowed to cause the action to occur and the third bitmap indicates that the requester is allowed to override protection against the action indicated in the second bitmap.

7. The computer-readable medium of claim 1, wherein the requester comprises a user-mode process of the desktop and wherein the security data comprises three bitmaps for each process of the desktop, wherein the first bitmap indicates whether its associated process is allowed to cause the action to occur, the second bitmap indicates whether an action is allowed to be performed on its associated process, and the third bitmap indicates whether its associated process is allowed to override protection indicated in the second bitmap.

8. In a computing environment, a method, comprising:
receiving a request to perform an action related to a process related to a desktop executing on a computer;
reading, from a memory, security data related to the request, wherein the security data comprises protecting others data, protecting from others data, and overriding data; and
allowing or denying the action based on a software check of the security data.

9. The method of claim 8, wherein the protecting others data indicates whether a process that provides the request has permission to cause the action to be performed.

10. The method of claim 8, wherein the protecting from others data indicates whether a process upon which the action is to operate is protected from other processes causing the action to occur.

11. The method of claim 8, wherein the overriding data indicates whether a process has permission to override the protecting from others data.

12. The method of claim 8, wherein the action comprises one or more of sending a message, hooking an input, injecting input, accessing a clipboard, and handle validation.

13. The method of claim 12, wherein sending a message comprises communication between at least two processes related to the desktop.

14. The method of claim 12, wherein the hooking an input comprises obtaining information from an input stream associated with the process.

15. The method of claim 12, wherein injecting input comprises providing input to the process.

16. The method of claim 12, wherein accessing a clipboard comprises reading or writing to the clipboard.

17. In a computing environment, an apparatus, comprising:
a processor;
a desktop;
a memory storing security data arranged to indicate whether an interaction between processes is allowed, wherein the security data comprises a portion that indicates whether a process is allowed to cause a requested action, a portion that indicates whether a process is protected from the requested action, and a portion that indicates whether a process is allowed to override a protection from the requested action; and
a security process executing on the processor arranged to access the security data in determining whether a first desktop process is allowed to interact with a second desktop process as requested by the first desktop process.

18. The apparatus of claim 17, wherein the security data comprises three bitmaps for each process of the desktop, wherein each bitmap represents one of the portions of the security data.

19. The apparatus of claim 17, further comprising:
memory storing computer-executable instructions which, when executed, implement a method comprising:
receiving a request to perform an action related to a process related to the desktop;
looking up security data related to the request, wherein the security data comprises protecting others data, protecting from others data, and overriding data; and
allowing or denying the action based on the security data.

* * * * *